United States Patent
Masuda et al.

(10) Patent No.: US 10,061,412 B2
(45) Date of Patent: Aug. 28, 2018

(54) MOBILE INFORMATION DISPLAY TERMINAL

(71) Applicant: SONY MOBILE COMMUNICATIONS AB, Lund (SE)

(72) Inventors: Takefumi Masuda, Mountain View, CA (US); Mi Zhou, San Jose, CA (US)

(73) Assignee: Sony Mobile Communications Inc., Tokyo (JP)

( * ) Notice: Subject to any disclaimer, the term of this patent is extended or adjusted under 35 U.S.C. 154(b) by 1050 days.

(21) Appl. No.: 13/731,686

(22) Filed: Dec. 31, 2012

(65) Prior Publication Data

US 2013/0169575 A1  Jul. 4, 2013

Related U.S. Application Data

(60) Provisional application No. 61/581,343, filed on Dec. 29, 2011.

(51) Int. Cl.
 *G06F 3/041* (2006.01)
 *G06F 1/16* (2006.01)

(52) U.S. Cl.
 CPC ............ *G06F 3/041* (2013.01); *G06F 1/1626* (2013.01); *G06F 1/1637* (2013.01)

(58) Field of Classification Search
 CPC ...................................................... G06F 1/1637
 See application file for complete search history.

(56) References Cited

U.S. PATENT DOCUMENTS

| | | | |
|---|---|---|---|
| 2006/0017706 A1* | 1/2006 | Cutherell et al. | 345/173 |
| 2007/0202917 A1* | 8/2007 | Phelps et al. | 455/556.1 |
| 2011/0195761 A1* | 8/2011 | Lee | G03B 17/02 |
| | | | 455/575.4 |

FOREIGN PATENT DOCUMENTS

| | | |
|---|---|---|
| JP | 2010-239323 | 10/2010 |
| JP | 2011-238027 | 11/2011 |

* cited by examiner

*Primary Examiner* — Hsin-Chun Liao
(74) *Attorney, Agent, or Firm* — Xsensus, LLP

(57) ABSTRACT

A mobile information display terminal narrows a width from the outermost portion of a chassis to an outermost portion of the effective display area by using a sealing part between the chassis and a flat surface of the display panel. The chassis has a panel facing wall that faces a main face of a touch-equipped display panel. The sealing part has an annular shape that substantially matches a periphery of an inner surface of said glass sheet.

8 Claims, 10 Drawing Sheets

MOBILE INFORMATION DISPLAY TERMINAL

CROSS REFERENCE TO RELATED APPLICATIONS

This application is related to and claims priority under 35 U.S.C. § 119(e) to Provisional Application Ser. No. 61/581,343, filed Dec. 29, 2011, the contents of which are hereby incorporated herein by reference.

TECHNICAL FIELD

The present invention relates to a mobile information terminal having a touch panel that can detect the touch or proximity of an external conductor such as a finger of a user by detecting a change in, for example, capacitance or the like and also having a display panel that can display various types of information.

BACKGROUND ART

FIGS. 16 and 17 schematically illustrate the partial cross sectional structure of a conventional mobile information terminal having a touch panel that can detect the touch or proximity of an external conductor such as a finger of a user by detecting a change in capacitance or the like and also having a display panel that can display various types of information. The individual components in FIGS. 16 and 17 are hatched to distinguish them on the drawings and not to represent their materials.

As illustrated in FIGS. 16 and 17, the conventional mobile information terminal has a window display module 109 formed by bonding a sheet of window glass 101 and a touch panel 103, which are both transparent, together by use of an adhesive 102 and further boding the touch panel 103 and a display panel 105 together by use of an adhesive 104.

When incorporated into the chassis of the mobile information terminal, the window display module 109 is placed so that the window glass 101 is disposed at the outermost position and the display panel 105 is disposed on the inner side of the chassis. In the description that follows, out of two main flat surfaces of the window glass 101, the main flat surface disposed on the inner side of the chassis when the window display module 109 is incorporated into the chassis will be appropriately referred to as the inner main flat surface and the main flat surface that is disposed on the outer side will be appropriately referred to as the outer main flat surface. The size of the window glass 101 in its main flat surface direction is larger than the sizes of the touch panel 103 and display panel 105 in their main flat surface directions. The touch panel 103, display panel 105, and window glass 101 are placed so that the central positions of their main flat surfaces substantially match. Therefore, the outer circumferential part (referred to below as the inner-surface outer circumferential part 101a) of the inner main flat surface of the window glass 101 protrudes outward from the outer circumferential parts of the touch panel 103 and display panel 105.

The chassis of the mobile information terminal is formed with a front chassis 107 and a back cover chassis 122 illustrated in FIGS. 16 and 17; the window display module 109 is incorporated into the front chassis 107 and a circuit board (not shown), a battery (not shown), and the like (not shown) are incorporated into the back cover chassis 122. When the front chassis 107, into which the window display module 109 has been incorporated, and the back cover chassis 122, into which the circuit board and the like have been incorporated, are assembled together, the mobile information terminal in a substantially rectangular plate shape as illustrated in FIG. 18 is formed.

FIG. 18 schematically illustrates the external appearance of the conventional mobile information terminal in a state in which the front chassis 107, into which the window display module 109 has been incorporated, and the back cover chassis 122, into which the circuit board and the like have been incorporated, are assembled together when viewed from the front side of the mobile information terminal. That is, as illustrated in FIG. 18, the outermost circumferential part of the mobile information terminal is the front-side circumferential edge 107b of the front chassis 107 and the window glass 101 is placed inside the front-side circumferential edge 107b. The mobile information terminal is arranged so that a display on the display panel 105 is visible through the window glass 101 and touch panel 103, which are both transparent.

As for the conventional mobile information terminal, the front chassis 107 has an opening on the side on which the window display module 109 is incorporated, as illustrated in FIGS. 16 to 18; a step (referred to below as a window glass mounting part 107a), on which the inner-surface outer circumferential part 101a of the window glass 101 is placed when the window display module 109 has been incorporated, is formed in the opening.

As for the conventional mobile information terminal, the entire circumferences of the window glass mounting part 107a and the inner-surface outer circumferential part 101a of the window glass 101 are bonded together by use of a double-sided adhesive tape 106. That is, as for the conventional mobile information terminal, the window display module 109 is secured to the front chassis 107 by bonding the entire circumferences of the window glass mounting part 107a and the inner-surface outer circumferential part 101a of the window glass 101 together by use of the double-sided adhesive tape 106.

The conventional mobile information terminal also includes a metal plate 121 that supports the window display module 109 from the inside of the front chassis 107, as illustrated in FIG. 17. The metal plate 121 is integrated into the front chassis 107 by, for example, being insert-molded. The metal plate 121 is also secured to the back cover chassis 122 by, for example, use of screws.

In addition, Japanese Unexamined Patent Application Publication No. 2011-238027 (PTL 1) discloses a mobile programmable display unit that can suppress the display panel, circuit board, and touch panel from being damaged due to an impact caused when the mobile information terminal drops or is struck against a structure or to deformation of the case. The mobile programmable display unit includes a liquid crystal panel, a touch panel, a front case, a panel shock absorbing material, a panel holder, and a holder shock absorbing material. The front case has an opening. The panel shock absorbing material is placed so as to enclose the periphery of the liquid crystal panel, the cross section of which has a shape in which the ends of the liquid crystal panel are interposed; the panel shock absorbing material is supported with its front surface and side surfaces abutting the inner surfaces of the panel holder. The panel holder, formed with a bottom frame and side walls, accommodates the liquid crystal panel and the panel shock absorbing material from the rear surface side, the circumference edge of the touch panel being secured to the front of the bottom frame. As for the mobile programmable display unit, the holder shock absorbing material is interposed between the front of the bottom frame and the inner surfaces of the front case.

Japanese Unexamined Patent Application Publication No. 2010-239323 (PTL 1) discloses a mobile terminal device that suppresses an increase in the number of parts and can prevent parts from being damaged. The mobile terminal device is formed with a liquid crystal panel, a touch panel, a liquid crystal module, a circuit board, a liquid crystal flexible cable, and two spacers. The liquid crystal panel displays various images. The touch panel, which is attached to the rear surface of the liquid crystal panel, detects a contact on the liquid crystal panel. The liquid crystal module outputs an image to be displayed on the liquid crystal panel. The circuit board includes a control circuit; the circuit board is used to have the liquid crystal module output an image and to carry out an appropriate process according to the position of the contact on the touch panel. The liquid crystal flexible cable is a flexible cable made of a flexible material; it mutually connects the control circuit on the circuit board and the liquid crystal module. One of the two spacers is formed with an insulating body; it is inserted into the clearance between the circuit board and the liquid crystal flexible cable. The other spacer is stuck to a movable case at a position at which the liquid crystal flexible cable is interposed between the one spacer and the other spacer. As for this mobile terminal device, the rear surface of the liquid crystal panel is stuck to the movable case in the vicinity of the outer circumference of the liquid crystal panel.

CITATION LIST

Patent Literature

[PTL 1] Japanese Unexamined Patent Application Publication No. 2011-238027 (FIG. 4)
[PTL 2] Japanese Unexamined Patent Application Publication No. 2010-239323 (FIG. 3)

SUMMARY OF INVENTION

As for the conventional mobile information terminal described above, the double-sided adhesive tape 106 secures the window display module 109, which has a certain weight, to the front chassis 107; even if the mobile information terminal drops on a floor or the like, the mobile information terminal can withstand the impact force due to the drop; the mobile information terminal also has a reasonable bonding width to prevent dust, water, and other foreign matter from entering the interior of the front chassis 107. As for currently available mobile information terminals, the bonding width (tape width) of the double-sided adhesive tape 106 is about 1.5 mm to 2.0 mm, for example.

The currently available mobile information terminals must also have a margin used at the time of incorporating the window display module 109 into the interior of the front chassis 107. To protect the window glass 101 and the like from an impact force applied to, for example, a side wall surface of the front chassis 107, the wall at the front-side circumferential edge 107b of the front chassis 107 must also have a certain thickness. As for the currently available mobile information terminals, the margin required in incorporation described above is about 1.0 mm to 1.5 mm, for example, and the wall at the front-side circumferential edge 107b of the front chassis 107 is about 0.8 mm to 1.5 mm thick, for example.

In the case of the currently available mobile information terminals, therefore, an outer circumferential width arw, as illustrated in FIG. 16, from the outermost circumferential edge of the front chassis 107 to the outermost circumferential edge of the effective display area aca of the display panel 105 must be at least about 4.0 mm in consideration of the tape width of the double-sided adhesive tape 106, the margin used at the time of incorporation described above, and the thickness of the wall at the front-side circumferential edge 107b of the front chassis 107. In the description that follows, the outer circumferential width arw from the outermost circumferential edge of the front chassis 107 to the outermost circumferential edge of the effective display area aca of the display panel 105 will be represented as the terminal frame width arw.

The display panels of recent mobile information terminals are becoming increasingly large and the front-side projection sizes of the mobile information terminals are becoming large accordingly. That is, the projection size of a conventional mobile information terminal has been often determined depending on the area occupied by the circuit board, the battery, and other devices, but the projection size of a recent mobile information terminal is determined by the display size of the display panel.

In the future, it is desired that mobile information terminals maintain superior portability and superior maneuverability and also have the advantage of being able to increase the amount of displayed information, which is obtained by enlarging the screen of the display panel. However, the conventional mobile information terminal described above requires the terminal frame width arw to be at least about 4.0 mm, for example; if an attempt is made to prevent the outer size of the mobile information terminal from becoming large to maintain the portability and maneuverability, it becomes hard to increase the amount of displayed information by enlarging the screen of the display panel; conversely, if the mobile information terminal is aimed at enlarging the screen, the resulting large outer size of the mobile information terminal lowers the portability and maneuverability.

In view of these situations, the inventor recognizes that a mobile information terminal having a touch panel and a display panel needs to have a large screen to increase the amount of displayed information and also maintain superior portability and maneuverability.

A mobile information display terminal according to one exemplary embodiment includes a display having a glass sheet, and a touch-equipped display panel that is laminated to said glass sheet. The touch-equipped display panel includes a touch panel, and a display panel that opposes said touch panel, said glass sheet having a smaller surface area on a main face thereof than a main face of said touch-equipped display panel.

A chassis is included that has a panel facing wall that faces said main face of the touch-equipped display panel. A sealing part is included that has an annular shape that substantially matches a periphery of an inner surface of the glass sheet. The inner surface is opposite of the main surface of the glass sheet. The sealing part is interposed between the panel facing wall and the main face of the touch-equipped display panel.

One aspect of the embodiment is that the terminal also includes a support plate part that supports the touch-equipped display panel from a rear surface side thereof.

According to another aspect of the embodiment, the chassis further includes a front chassis part that forms a front side of the mobile information display terminal, and a rear chassis part on a rear side of the mobile information display terminal.

According to another aspect of the embodiment, the front chassis part has a groove part in an inner wall surface of the front chassis part, said groove sized to receive an end of the support plate part.

According to another aspect of the embodiment, the rear chassis part and the support plate part each are configured to receive a securing part that secures the support plate part to the rear chassis part.

According to another aspect of the embodiment, the support plate part has a plurality of claw parts protruding from at least one end thereof, and the front chassis part has a plurality of notches on the inner wall surface, which extend to the groove part and configured to receive respective of the plurality of claw parts of the support plate part are movably inserted.

According to another aspect of the embodiment, the groove part of the front chassis part slidably supports the plurality of claws of the support plate part.

According to another aspect of the embodiment, the front chassis part includes a chassis securing part that secures the rear chassis part, and the rear chassis part includes a chassis securing part that secures the front chassis part.

According to another aspect of the embodiment, the rear chassis part and the support plate part each include a support plate securing part that secures the support plate part to the rear chassis part.

According to another aspect of the embodiment, central positions of the main face of said glass sheet and the main face of said touch-equipped display panel substantially match.

According to another aspect of the embodiment, the sealing part has a ring shape.

That is, in the embodiment of the present invention, since the mobile information terminal is assembled by interposing the sealing part between the panel facing wall surface part of the chassis part and the flat surface having the prescribed shape formed by the outer circumferences of the window glass and touch-panel-equipped display panel, the outer circumferential width from the outermost circumferential edge of the chassis on the front side to the outermost circumferential edge of the effective display area of the display panel can be narrowed as much as possible and a sufficient area can be obtained as the effective display area.

In the embodiment of the present invention, since the outer circumferential width from the outermost circumferential edge of the chassis on the front side to the outermost circumferential edge of the effective display area of the display panel can be narrowed as much as possible and a sufficient area can be obtained as the effective display area, it is possible to increase the amount of displayed information by enlarging the screen and to maintain superior portability and maneuverability.

DESCRIPTION OF EMBODIMENTS

An advanced mobile information terminal having a touch-panel-equipped display panel 4 will be described below as an embodiment of the present invention with reference to the drawings, the touch-panel-equipped display panel 4 being formed by integrally mounting a touch panel 3, which can detect the contact or proximity of a finger of a user or another external conductor by detecting a change in capacitance or the like directly, on the panel surface of a display panel 5 that can display various types of information.

Overview of the Mobile Information Terminal in this Embodiment

Figure 1:
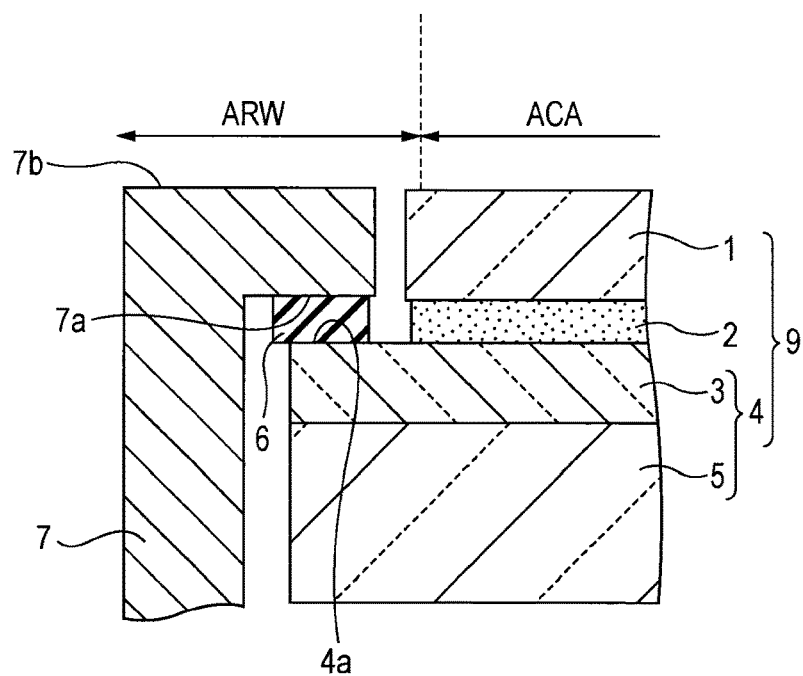
FIG. 1 is a cross sectional view that schematically illustrates the partial cross sectional structure of a mobile information terminal in an embodiment of the present invention.

FIG. 1 schematically illustrates the partial cross sectional structure of the mobile information terminal in the embodiment of the present invention. The individual components in FIG. 1 are hatched to distinguish them on the drawing and not to represent their materials. This is also true for the subsequent cross sectional views.

As illustrated in FIG. 1, the mobile information terminal in this embodiment has a window display module 9 formed by bonding the touch-panel-equipped display panel 4, formed by integrally mounting the transparent touch panel 3 directly on the panel surface of the display panel 5, and a sheet of transparent window glass 1 in a rectangular plate shape together by use of an adhesive 2.

The window display module 9 is placed so that when it is incorporated into the chassis of the mobile information terminal, the window glass 1 is disposed at the outermost position and the display panel 5 is disposed on the inner side of the chassis. In the description that follows, out of two main flat surfaces of the window glass 1, the main flat surface disposed on the inner side of the chassis when the window display module 9 is incorporated into the chassis will be appropriately referred to as the window inside flat surface and the main flat surface that is disposed on the outer side (on the front side of the terminal) will be appropriately referred to as the window outside main flat surface. In the description that follows, out of two main flat surfaces of the touch-panel-equipped display panel 4, the main flat surface disposed on the same side as the window glass 1 will be appropriately referred to as the panel upper-side main flat surface and the main flat surface that is disposed inside the chassis when the window display module 9 is incorporated into the chassis will be appropriately referred to as the panel inside main flat surface.

The size of the touch-panel-equipped display panel 4 in its main flat surface direction is larger than the size of the main flat surface of the window glass 1. The touch-panel-equipped display panel 4 and window glass 1 are laminated so that the central positions of their main flat surfaces substantially match. That is, the outer circumference (referred to below as the panel upper-side outer circumference 4a) of the panel upper-side main flat surface of the touch-panel-equipped display panel 4 protrudes outward from the outer circumferential part of the window glass 1, and forms a rectangular ring surface, which is formed by the outer circumference shapes of the window glass 1 and touch-panel-equipped display panel 4.

Figure 2:
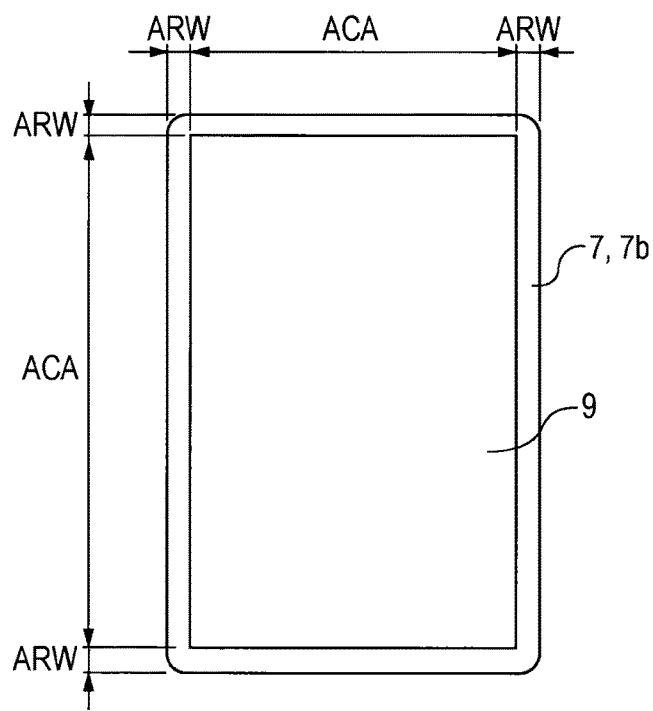
FIG. 2 is a schematic front view of the mobile information terminal, in this embodiment, manufactured by incorporating a window display module into a front chassis and a back cover chassis.

The chassis of the mobile information terminal in this embodiment is formed with a front chassis 7 as illustrated in FIGS. 1 and 2 and a rear chassis (referred to below as a back cover chassis 23), which will be described later with reference to FIG. 5 etc. As for the mobile information terminal in this embodiment, the window display module 9 is incorporated into the front chassis 7 as described later, and a circuit board, a battery, and the like are incorporated into the back cover chassis 23. When the front chassis 7, into which the window display module 9 has been incorporated, and the back cover chassis 23, into which the circuit board and the like have been incorporated, are assembled together, a mobile information terminal in a substantially rectangular plate shape as illustrated in FIG. 2 is formed as the mobile information terminal in this embodiment.

FIG. 2 substantially illustrates the external appearance of the mobile information terminal in this embodiment in a state in which the front chassis 7, into which the window display module 9 has been incorporated, and the back cover chassis 23, into which the circuit board and the like have been incorporated, are assembled together when viewed from the front side of the mobile information terminal. That is, as illustrated in FIG. 2, the outermost circumferential part of the mobile information terminal in this embodiment is the front-side circumferential edge 7b of the front chassis 7 and the window glass 1 is placed inside the front-side circumferential edge 7b. The mobile information terminal in this embodiment is arranged so that the display surface of the display panel 5 is visible through the window glass 1 and touch panel 3, which are both transparent.

As for the mobile information terminal in this embodiment, the front chassis 7 has an opening on the side facing the back cover chassis 23 when the mobile information terminal has been assembled and also an opening on the side on which the display surface of the window display module 9 is placed; these openings mutually communicate through their wall surfaces, forming a substantially rectangular shape. Of the openings of the front chassis 7, the opening on the side facing the back cover chassis 23 will be referred to below as the base-side opening and the opening on the display surface side will be referred to below as the front-side opening.

The front-side opening of the front chassis 7 has a wall surface part (referred to below as the panel facing wall surface part 7a) that faces the panel upper-side outer circumference 4a of the touch-panel-equipped display panel 4 with a sealing material (referred to below as a gasket 6), described later, intervening therebetween when the window display module 9 has been incorporated. In this embodiment, the panel facing wall surface part 7a is formed with a lower wall surface (lower wall surface of the front-side circumferential edge 7b) in a state in which a wall of the front-side opening of the front chassis 7 is bent substantially at right angles in the inner-side direction of the opening. That is, the panel facing wall surface part 7a has a rectangular ring surface that faces the panel upper-side outer circumference 4a of the touch-panel-equipped display panel 4 when the touch-panel-equipped display panel 4 has been incorporated into the front chassis 7.

The gasket 6 is formed in a rectangular ring shape that suits the shapes of the panel facing wall surface part 7a of the front chassis 7 and the panel upper-side outer circumference 4a of the touch-panel-equipped display panel 4; the cross sectional shape of the gasket 6 is, for example, rectangular as illustrated in FIG. 1. The gasket 6 is made of a material having tight adhesion, a cushion property, a water proofing property, adhesiveness, and the like. As for the mobile information terminal in this embodiment, the gasket 6 is placed between the panel facing wall surface part 7a of the front chassis 7 and the panel upper-side outer circumference 4a of the touch-panel-equipped display panel 4 and interposed between the panel facing wall surface part 7a and the panel upper-side outer circumference 4a. The gasket 6 may be interposed in a state in which the panel facing wall surface part 7a and the panel upper-side outer circumference 4a apply a force in a direction in which the force presses the gasket 6 against their counterpart. Alternatively, the gasket 6 may be interposed by being bonded to the panel facing wall surface part 7a and the panel upper-side outer circumference 4a due to the adhesive capability of the gasket 6. Of course, the gasket 6 may be interposed in a state in which the forces applied in the pressing directions and the adhesive capability of the gasket 6 are both used. The cross sectional shape of the gasket 6 is not limited to the above rectangular shape; it may be a circle, an ellipse, a triangle, a polygon having sides at least as many as the number of sides of a pentagon, or a shape in which grooves or the like are formed on the surfaces facing the panel facing wall surface part 7a and the panel upper-side outer circumference 4a.

As described above, the mobile information terminal in this embodiment has the panel upper-side outer circumference 4a in a rectangular ring surface shape on the window display module 9, and also has the panel facing wall surface part 7a in a rectangular ring surface shape on the front chassis 7, the mobile information terminal being structured so that the gasket 6 in a rectangular ring shape is interposed between the panel upper-side outer circumference 4a and the panel facing wall surface part 7a.

That is, since the gasket 6 having tight adhesion, a cushion property, a water proofing property, adhesiveness, and the like is interposed over the entire ring circumferences of the panel facing wall surface part 7a and panel upper-side outer circumference 4a, the mobile information terminal in this embodiment can prevent water and dust from entering the clearance between the front chassis 7 and the touch-panel-equipped display panel 4.

Since the mobile information terminal in this embodiment is structured so that the panel facing wall surface part 7a of the front chassis 7 presses the panel upper-side outer circumference 4a of the window display module 9 in a state in which the gasket 6 having tight adhesion intervenes therebetween, even if the terminal drops, it is possible to prevent the touch-panel-equipped display panel 4 and the like from coming off.

Since, as for the mobile information terminal in this embodiment, the gasket 6 has a cushion property, it is also possible to protect the touch-panel-equipped display panel 4 and the like from an impact caused when, for example, the terminal drops. The cushion property of the gasket 6 also enables it to function to absorb variations among various constituent elements in the thickness direction of the terminal during the assembling of the mobile information terminal and maintain the constituent elements at correct assembling positions.

As for the mobile information terminal in this embodiment, the margin used at the time of incorporating the window display module 9 into the front chassis 7 is, for example, about 0.2 mm to 0.3 mm. In this embodiment, the width from the outermost circumferential edge of the display panel 5 to its effective display area ACA is, for example, about 1.0 mm to 1.5 mm, and the thickness of the side wall surface of the front chassis 7 is, for example, about 0.8 mm to 1.5 mm. As for the mobile information terminal in this embodiment, therefore, an outer circumferential width ARW, as illustrated in FIG. 1, from the outermost circumferential edge of the front chassis 7 to the effective display area ACA of the display panel 5 may be, for example about 2.3 mm, which is the sum of the width of the margin used at the time of the incorporation described above, the width from the outermost circumferential edge of the display panel 5 to the effective display area ACA, and the thickness of the side wall surface of the front chassis 7. In the description that follows, the outer circumferential width ARW from the outermost circumferential edge of the front chassis 7 to the effective display area ACA of the display panel 5 will be represented as the case frame width ARW.

Figure 18:
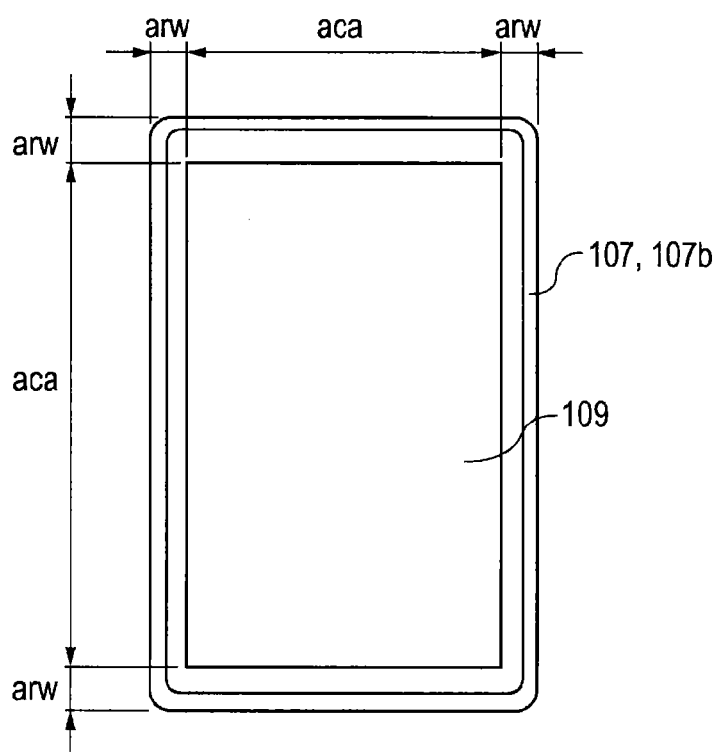
FIG. 18 is a schematic front view of the conventional mobile information terminal manufactured by incorporating the window display module into a front chassis and a back cover chassis.

Thus, according to the mobile information terminal in this embodiment, the case frame width ARW can be significantly reduced as compared with the example of the conventional mobile information terminal illustrated in FIG. 18. In other words, as for the mobile information terminal in this embodiment, the ratio of the effective display area ACA of the display panel in the front-side projection size of the mobile information terminal can be increased, that is, the display screen size can be more increased, enabling the amount of displayed information to be increased. Yet, as for the mobile information terminal in this embodiment, it is possible to suppress the front-side projection size of the terminal from being enlarged, so superior portability and maneuverability can be maintained.

Figure 3:
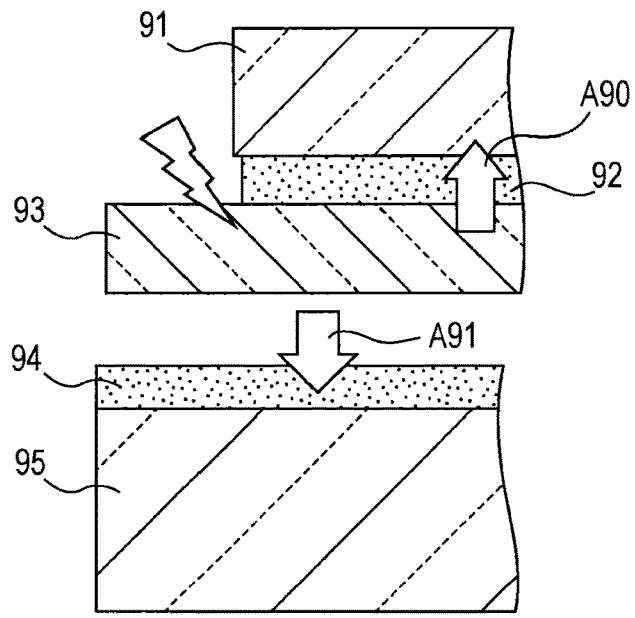
FIG. 3 is a drawing used to explain a problem that arises when the window display module of the mobile information terminal in this embodiment is manufactured by use of an existing manufacturing process.

Problems with the Manufacturing of the Mobile Information Terminal in this Embodiment and their Solutions In an existing process to manufacture a window display module formed by laminating a sheet of window glass, as illustrated in, for example, FIG. 3, a touch panel, and a display panel, the window display module is manufactured by carrying out the process indicated by the arrow A90 in the drawing, in which a sheet of window glass 91 and a touch panel 93 are bonded together by use of an adhesive 92, followed by the process indicated by the arrow A91 in the drawing, in which a display panel 95 and the touch panel 93 bonded to the window glass 91 are further bonded together by use of an adhesive 94.

Since the thickness of the touch panel 93 is very small (for example, about 0.1 mm to 0.2 mm), however, when the touch panel 93 having a larger main flat surface than, for example, the window glass 91 is bonded by use of the adhesive 92 to manufacture the window display module 9 as in, for example, this embodiment, the portion protruding from the outer circumference of the window glass 91 may be damaged.

Figure 4:
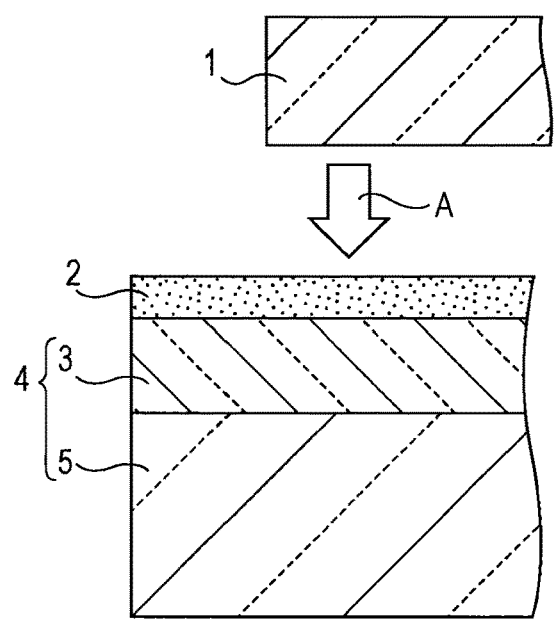
FIG. 4 is a drawing used to explain a process to manufacture the window display module of the mobile information terminal in this embodiment by solving the problem with the existing manufacturing process.

In contrast, as illustrated in FIG. 4, the window display module 9 in this embodiment is manufactured by carrying out the process indicated by the arrow A in the drawing, in which the window glass 1 having a smaller main flat surface than the touch-panel-equipped display panel 4 is bonded to the touch-panel-equipped display panel 4, which is formed by integrally mounting the transparent touch panel 3 directly on the panel surface of the display panel 5, by use of the adhesive 2. According to this embodiment, therefore, damage of the touch panel 3 and other problems are not caused during the manufacturing of the window display module 9.

Figure 5:
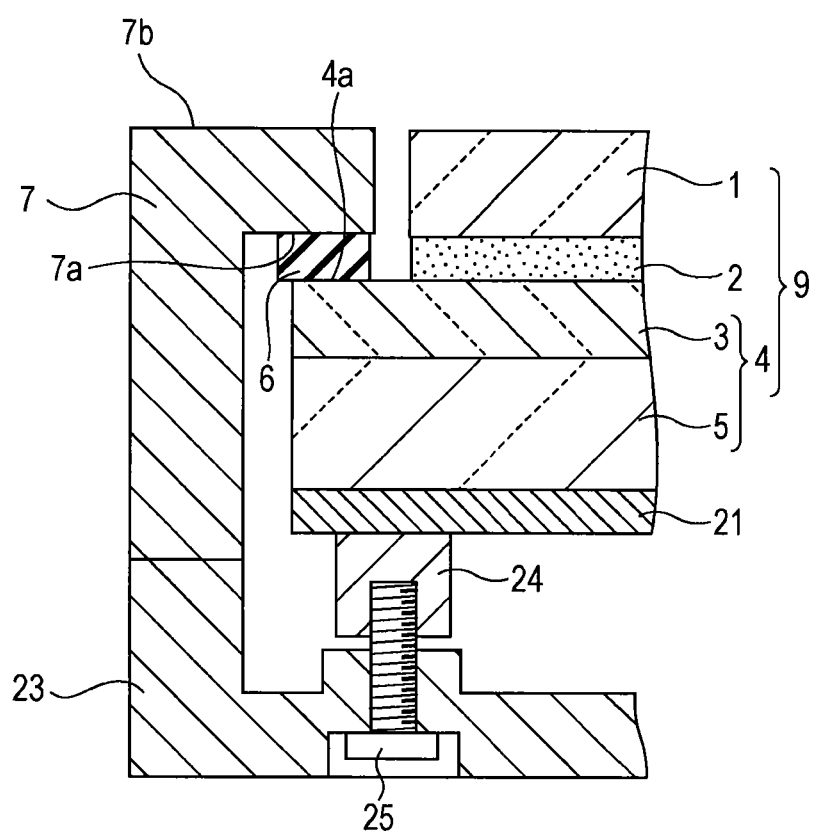
FIG. 5 is a cross sectional view that schematically illustrates the partial cross sectional structure of the mobile information terminal in this embodiment in a state in which the window display module is incorporated into the chassis.

Example of Assembling to Manufacture the Mobile Information Terminal in this Embodiment The mobile information terminal in this embodiment includes the front chassis 7 and back cover chassis 23 as illustrated in FIG. 5; as described above, the window display module 9 is incorporated into the front chassis 7 and a circuit board and the like are incorporated into the back cover chassis 23.

The mobile information terminal in this embodiment also has a metal plate 21 that prevents the window display module 9 from moving in the chassis due to, for example, vibration or another external force applied to the window glass 1 and supports the display panel 5 of the window display module 9 from the rear surface side. In this embodiment, the metal plate 21 is formed with, for example, a stainless steel plate in a rectangular plate shape similar to the shape of the base-side opening of the front chassis 7. A circuit board and other components placed on the same side as the back cover chassis 23 can also be mounted as structural bodies mounted on the metal plate 21. To assemble the circuit board and other structural bodies onto the metal plate 21, a method in which they are assembled by engaging screws or the like with insert-molded or welded nuts can be used as an example. The metal plate 21 is also secured to the back cover chassis 23 by engaging a screw 25 with a nut 24 welded to the metal plate 21.

Figure 6:
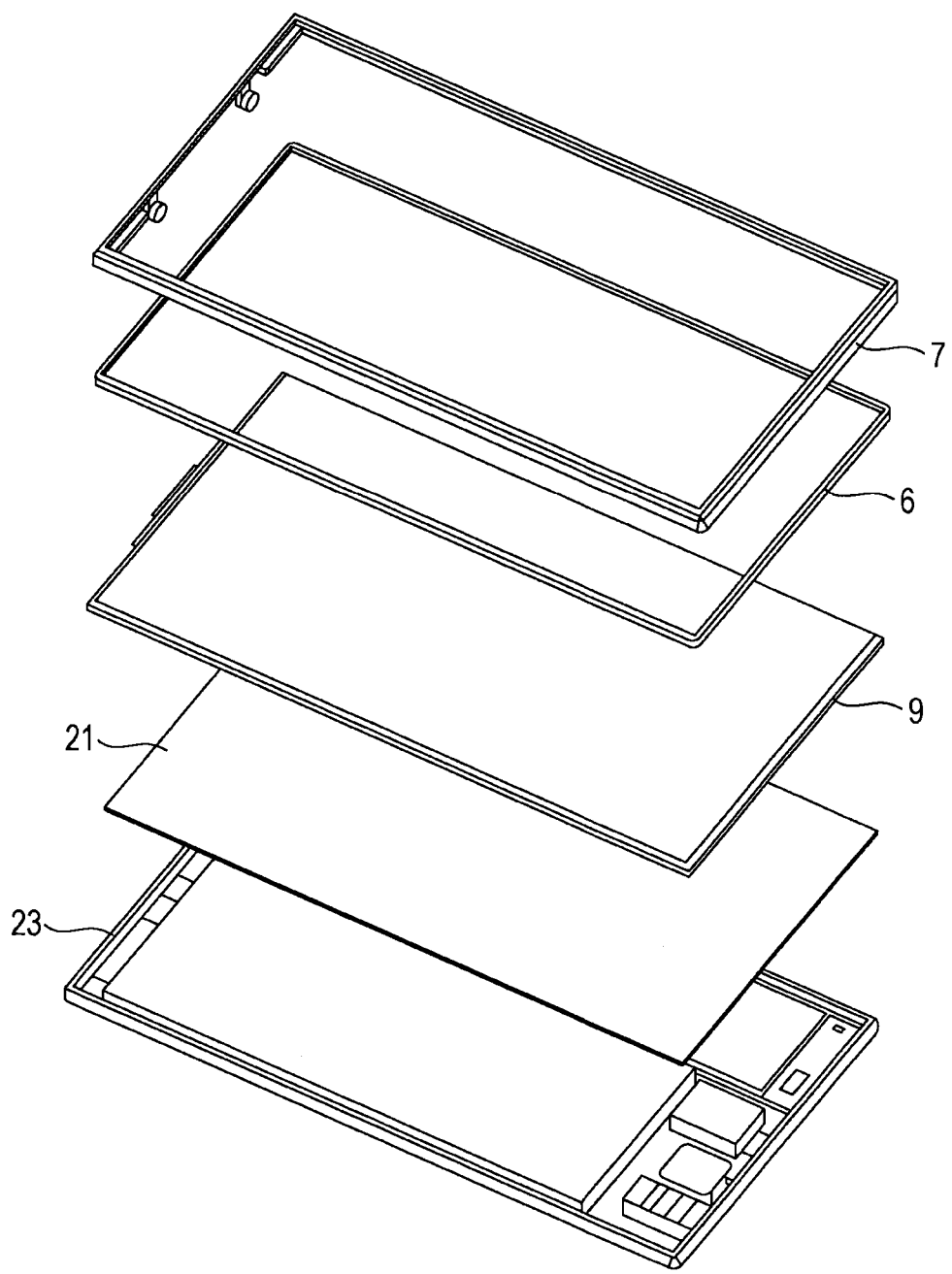
FIG. 6 is a schematic exploded perspective view when the mobile information terminal in the embodiment of the present invention is assembled.

FIG. 6 is a schematic exploded perspective view when the mobile information terminal in the embodiment of the present invention is assembled.

As illustrated in FIG. 6, the mobile information terminal in this embodiment is structured by assembling the front chassis 7, the gasket 6, the window display module 9 with the window glass 1 stuck to the touch-panel-equipped display panel 4, the metal plate 21, and the back cover chassis 23 so that they are placed as in FIG. 6. The back cover chassis 23 in the case in FIG. 6 is in a state in which, for example, a circuit board, a battery, and other constituent elements have been assembled.

Figure 16:
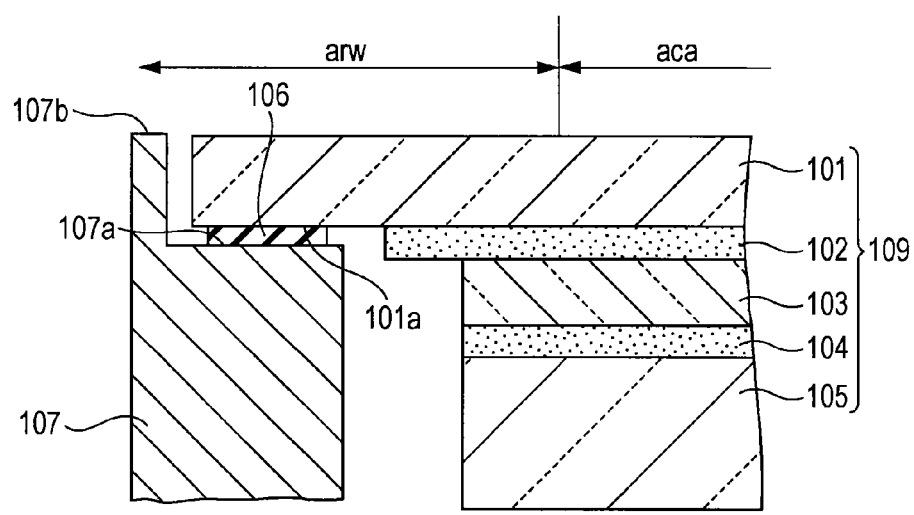
FIG. 16 is a cross sectional view that schematically illustrates the partial cross sectional structure of a conventional mobile information terminal that has a touch panel and a display panel.
Figure 17:
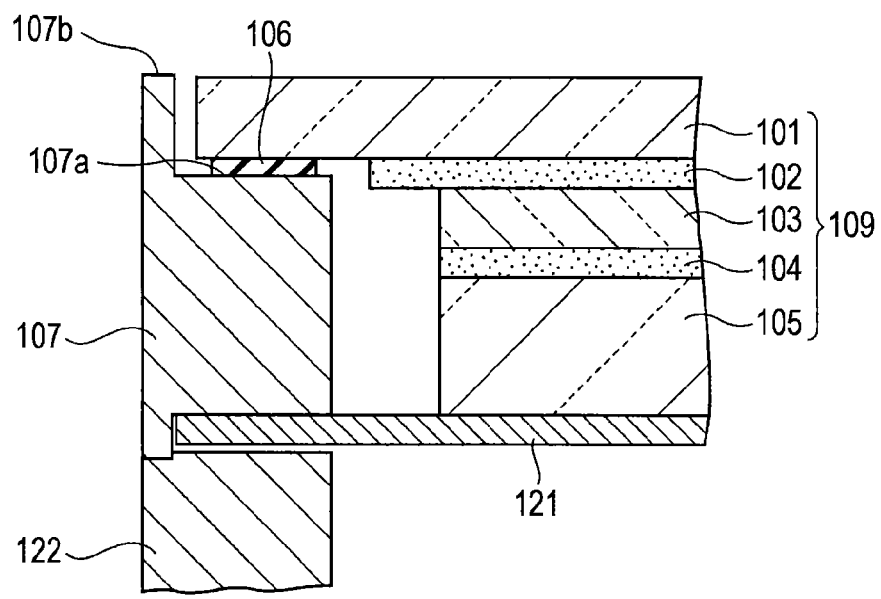
FIG. 17 is a cross sectional view that schematically illustrates the partial cross sectional structure of the conventional mobile information terminal in a state in which a window display module has been incorporated into a chassis.

As for the conventional mobile information terminal, which has been described with reference to FIGS. 16 to 18, the metal plate 121 is often integrally formed with the front chassis 107 by, for example, so-called insert molding.

However, the placement of the window display module 9 in the front chassis 7 of the mobile information terminal in this embodiment completely differs from the placement of the window display module 109 in the front chassis 109 of the conventional mobile information terminal described with reference to FIGS. 16 to 18.

As for the mobile information terminal in this embodiment, therefore, the metal plate 21 cannot be integrally formed with the front chassis 7 by, for example, being insert-molded, and the metal plate 21 and the front chassis 7 must be formed as separate parts. As for the mobile information terminal in this embodiment, since the case frame width ARW is very narrow as described above, a structure to attach the metal plate 21 to the front chassis 7 must also be devised.

Accordingly, for example, one of two incorporating methods, a first incorporating method and a second incorporating method, as described below is used at the time of manufacturing the mobile information terminal in this embodiment so that the metal plate 21 can be assembled to the front chassis 7. The first and second incorporating methods are just examples; the present invention is not limited to these methods.

[First Incorporating Method]

Figure 7:
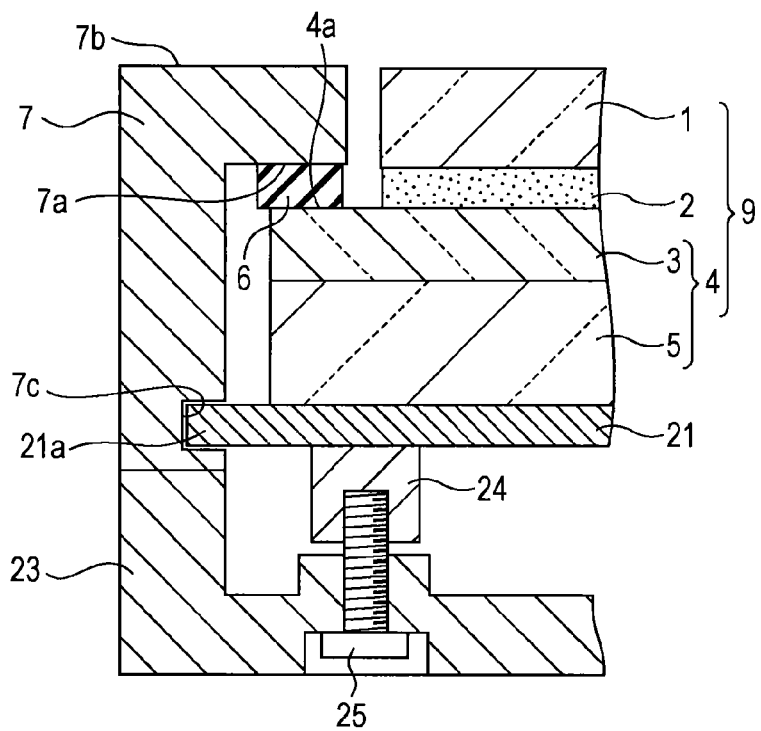
FIG. 7 is a cross sectional view that schematically illustrates the partial cross sectional structure of the mobile information terminal assembled by use of a first incorporating method in the embodiment of the present invention.
Figure 8:
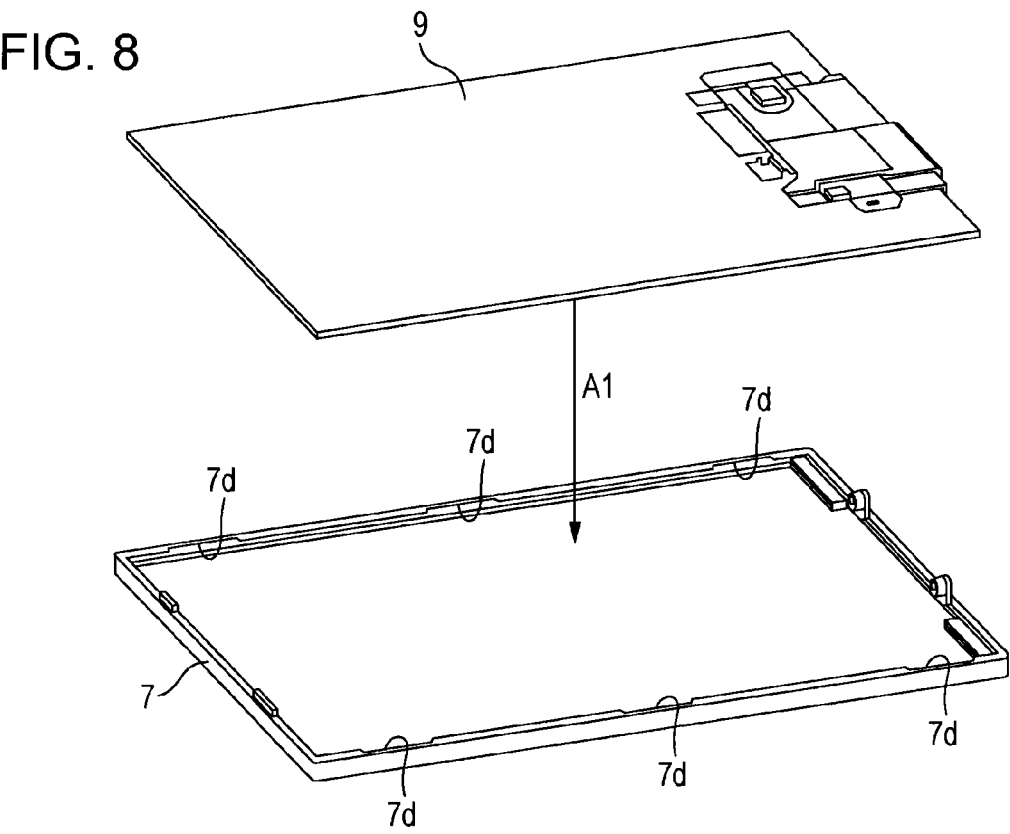
FIG. 8 is a drawing used to explain a process, in the first incorporating method in the embodiment of the present invention, in which the window display module is fitted from an opening on the base side of the front chassis in a state in which a gasket is placed on a panel facing wall surface part.
Figure 9:
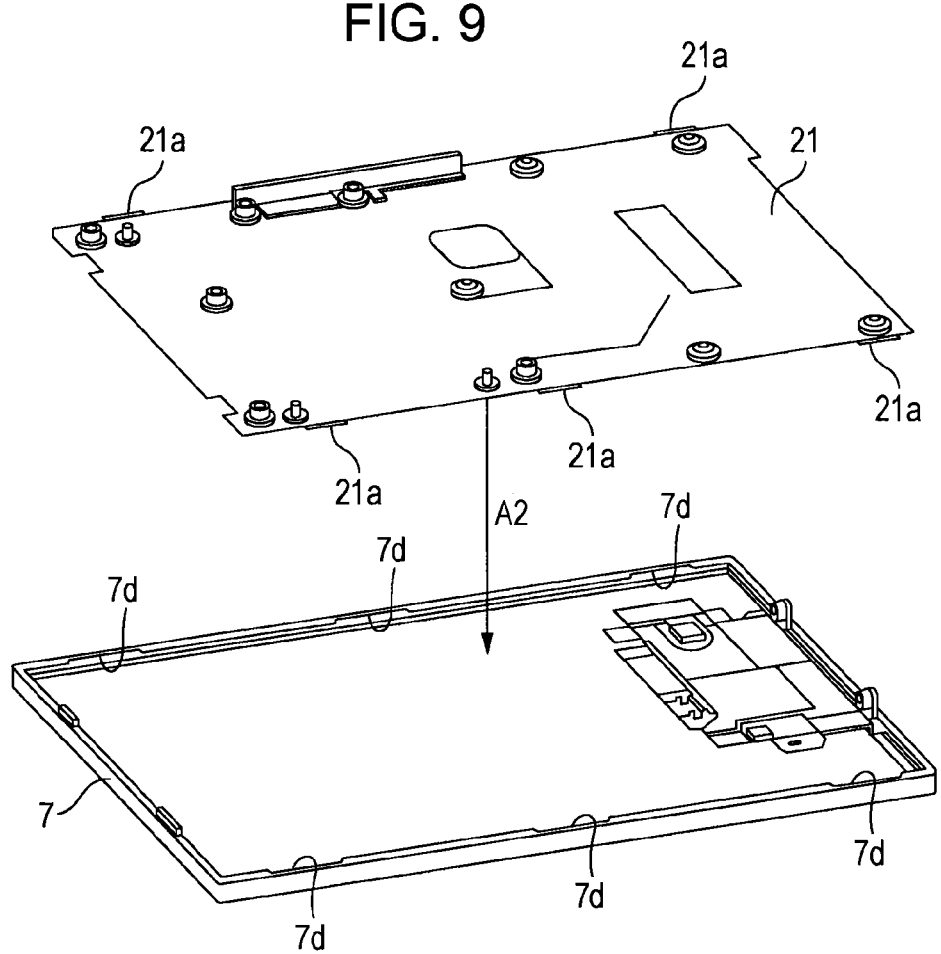
FIG. 9 is a drawing used to explain a process, in the first incorporating method in the embodiment of the present invention, in which a metal plate is fitted from the opening on the bases side of the front chassis into which the window display module has been fitted.
Figure 10:
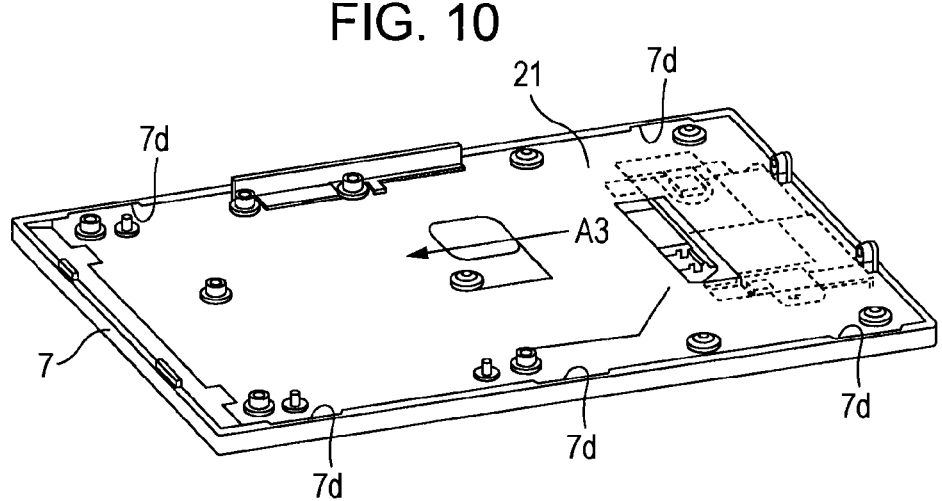
FIG. 10 is a drawing used to explain a process, in the first incorporating method in the embodiment of the present invention, in which the front chassis into which the window display module has been fitted is slid to a prescribed position in a longitudinal direction of a groove part of the front chassis.

FIG. 7 is a cross sectional view that schematically illustrates the partial cross sectional structure of the mobile information terminal in this embodiment assembled by use of the first incorporating method. FIGS. 8 to 10 illustrate processes to incorporate individual constituent elements by use of the first incorporating method.

In the first incorporating method in this embodiment, the metal plate 21 has a plurality of claw parts 21a protruding from the side walls in its longitudinal direction, as illustrated in FIG. 9.

In the first incorporating method in this embodiment, the front chassis 7 has groove parts 7c, in the longer-edge inner walls, which extend in the longer-edge direction, as illustrated in FIGS. 8 to 10. The width of the groove part 7c is slightly larger than the thickness of the claw part 21a of the metal plate 21; when the claw part 21a is fitted into the groove part 7c as described later, therefore, the claw part 21a can slide in the groove part 7c in the longitudinal direction.

As illustrated in FIGS. 8 to 11, the front chassis 7 also has a plurality of notch parts 7d on the inner circumferential edge sides of the base-side opening, which faces the back cover chassis 23 when the mobile information terminal has been assembled, in the longitudinal direction, each notch part 7d being formed so as to be recessed from the inner circumferential wall and extend to the groove part 7c.

The plurality of claw parts 21a of the metal plate 21 and the plurality of notch parts 7d of the front chassis 7 are placed so that they face each other in one-to-one correspondence, and each claw part 21a is provided so that it is movably inserted into its corresponding notch part 7d. When the claw part 21a, which has been movably inserted into the notch part 7d, reaches the groove part 7c, the claw part 21a can slide in the 7c of the back cover chassis 23 in the longitudinal direction.

In the first incorporating method, as illustrated in FIG. 8, the window display module 9 is first fitted from the base-side opening of the front chassis 7 as illustrated by the arrow A1 in the drawing in a state in which the gasket 6 is placed on the panel facing wall surface part 7a of the front chassis 7. Thus, as described above, the gasket 6 is interposed between the panel facing wall surface part 7a of the front chassis 7 and the panel upper-side outer circumference 4a of the touch-panel-equipped display panel 4. With the window display module 9 at that time, the window glass 1 is on the lower side in the drawing.

Next, as illustrated in FIG. 9, the metal plate 21 is fitted from the base-side opening of the front chassis 7, into which the window display module 9 has been fitted, as illustrated by the arrow A2 in the drawing. In this fitting, the plurality of claw parts 21a of the metal plate 21 are movably inserted into the plurality of notch parts 7d and are dropped into the groove parts 7c of the front chassis 7. Thus, each claw part 21a of the metal plate 21 is placed in a state in which it can slide in the groove part 7c of the front chassis 7.

Figure 11:
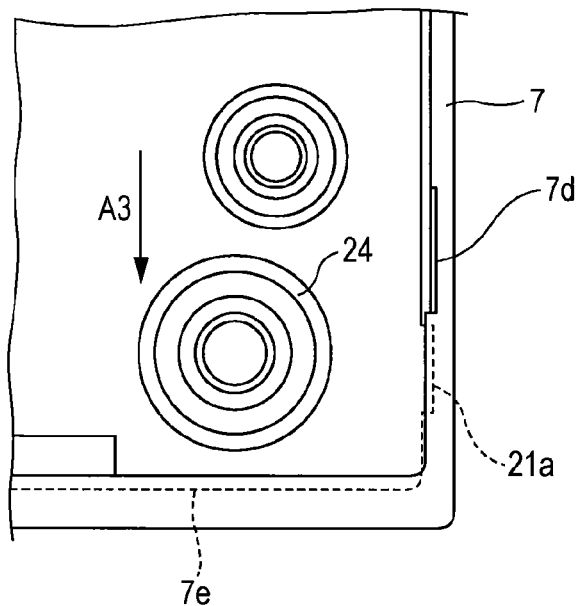
FIG. 11 is an enlarged view of part of the metal plate and front chassis in the first incorporating method in the embodiment of the present invention; the drawing is used to explain a process to fit the end of a shorter side of the metal plate into a plate fitting groove formed in an inner wall surface in the shorter side direction of the front chassis.

Next, the metal plate 21 is slid to a prescribed position in the longitudinal direction of the groove parts 7c of the front chassis 7 as illustrated in the arrow A3 in FIGS. 10 and 11. FIG. 11 is an enlarged view of part of the metal plate 21 and front chassis 7. In the first incorporating method, the prescribed position is a position at which a shorter end of the metal plate 21 fits into a plate fitting groove part 7e formed in an inner wall surface of the front chassis in the shorter-edge direction. The width of the plate fitting groove part 7e is such that when the metal plate 21 fits, it can be substantially secured. Since being supported by the groove parts 7c and plate fitting groove part 7e of the chassis, the metal plate 21 is secured in a state in which the metal plate 21 is not easily removed from the front chassis 7.

In the first incorporating method, the metal plate 21 is then secured to the back cover chassis 23 by engaging a screw 25 with a nut 24, which has been welded, for example, to the metal plate 21. Accordingly, even if an external force such as vibration is applied to the mobile information terminal, the metal plate 21 does not move in the chassis.

[Second Incorporating Method]

Figure 12:
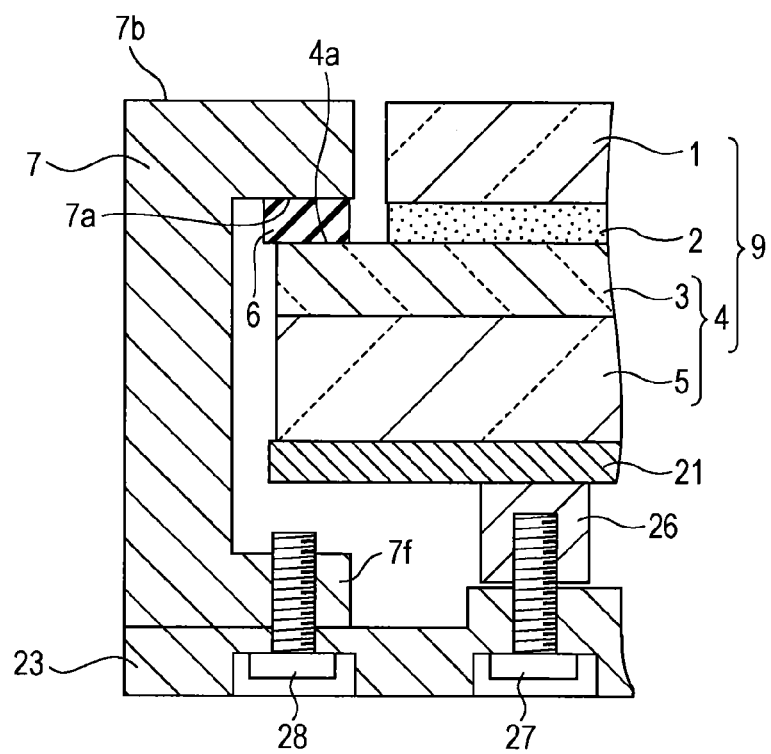
FIG. 12 is a cross sectional view that schematically illustrates the partial cross sectional structure of the mobile information terminal assembled by use of a second incorporating method in the embodiment of the present invention.
Figure 13:
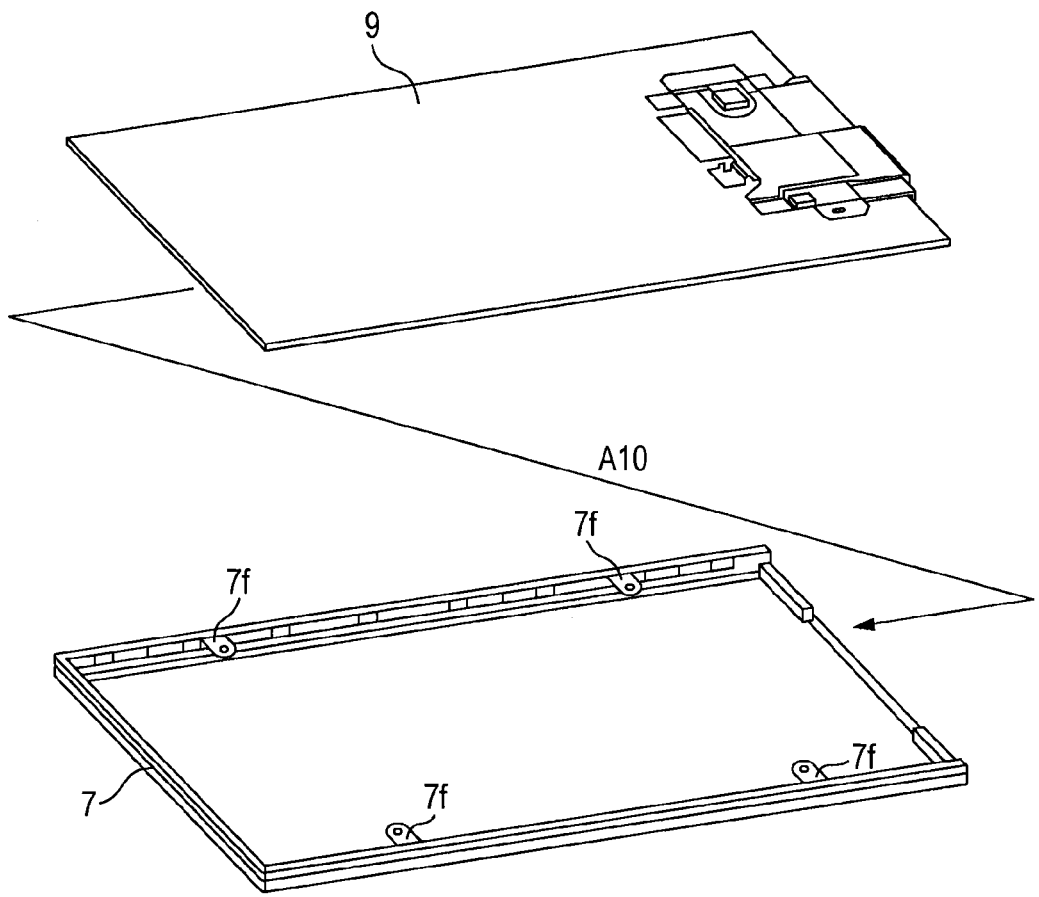
FIG. 13 is a drawing used to explain a process, in the second incorporating method in the embodiment of the present invention, in which the window display module is inserted from the same side as one shorter-side wall surface of the front chassis in a state in which the gasket is placed on the panel facing wall surface part.
Figure 14:
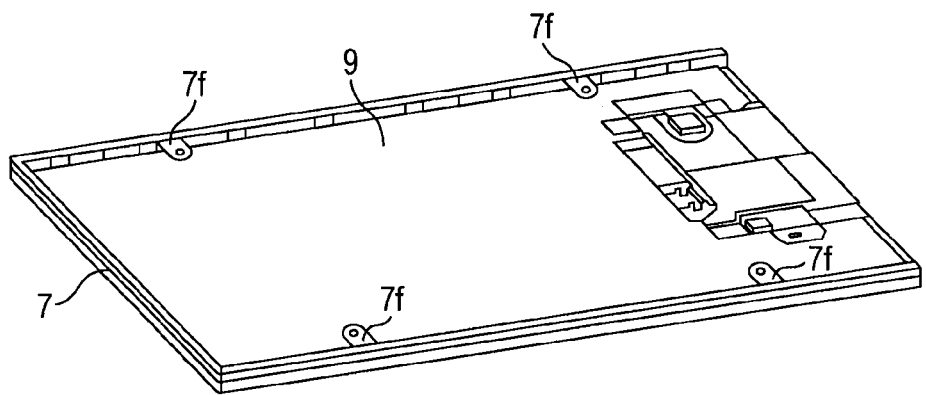
FIG. 14 is a drawing used to explain a process, in the second incorporating method in the embodiment of the present invention, in which the window display module is dropped vertically into the front chassis after the window display module has been completely inserted into the front chassis.
Figure 15:
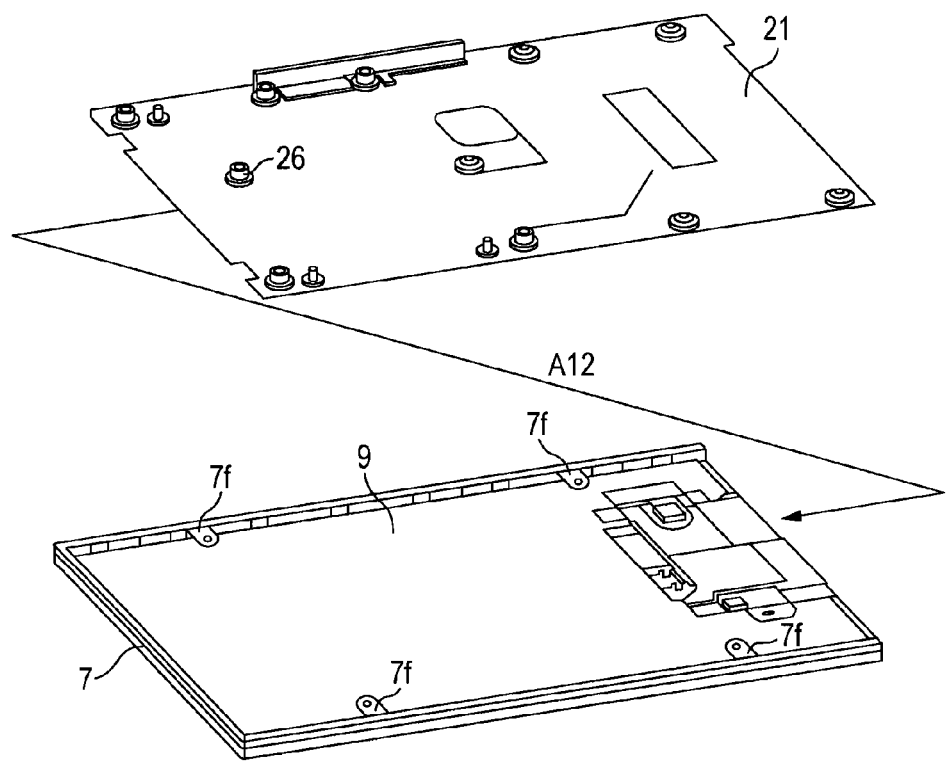
FIG. 15 is a drawing used to explain a process, in the second incorporating method in the embodiment of the present invention, in which the metal plate is inserted from the same side as one shorter-side wall surface of the front chassis into which the window display module has been fitted.

FIG. 12 is a cross sectional view that schematically illustrates the partial cross sectional structure of the mobile information terminal in this embodiment assembled by use of the second incorporating method. FIGS. 13 to 15 illustrate processes to incorporate individual constituent elements by use of the second incorporating method.

In the second incorporating method in this embodiment, the height of one shorter-edge wall surface of the front chassis 7, for example, is smaller than the height of the other shorter-edge wall surface. Therefore, the window display module 9 can be inserted from the one shorter-edge wall surface side as illustrated by the arrow A10 in FIG. 13, and the metal plate 21 can also be inserted as illustrated by the arrow A12 in FIG. 15.

As illustrated in FIGS. 12 to 15, the front chassis 7 also has a plurality of screw accepting projection parts 7f on, for example, the inner circumferential edge sides of the base-side opening, which faces the back cover chassis 23 when the mobile information terminal has been assembled, in the longitudinal direction, each projection 7f being formed so as to extend from the relevant inner circumferential edge to the opening. The plurality of screw accepting projection parts 7f each have a screw accepting hole, with which a screw 28 is engaged through its threaded hole formed in the base plate 23 when the front chassis 7 and back cover chassis 23 are assembled together.

In the second incorporating method, as illustrated in FIG. 13, the window display module 9 is first inserted from the one shorter-edge wall surface side of the front chassis 7 as illustrated by the arrow A10 in the drawing in a state in which the gasket 6 is placed on the panel facing wall surface part 7a of the front chassis 7. To prevent the window glass 1 from interfering with the front chassis 7 during the insertion of the window display module 9, it is inserted while being separated from the front chassis 7 by an amount slightly than the thickness of the window glass 1. After the window display module 9 has been completely inserted into the front chassis 7, the window display module 9 is dropped vertically into the front chassis 7 as illustrated by the arrow A11 in FIG. 14. Then, the gasket 6 is interposed between the panel facing wall surface part 7a of the front chassis 7 and the panel upper-side outer circumference 4a of the touch-panel-equipped display panel 4, as described above. With the window display module 9 at that time, the window glass 1 is on the lower side in the drawing.

Next, as illustrated in FIG. 15, the metal plate 21 is inserted from the one shorter-edge wall surface side of the front chassis 7, into which the window display module 9 has been fitted, as illustrated by the arrow A12 in the drawing. After the metal plate 21 has been completed inserted into the front chassis 7, the metal plate 21 is dropped vertically into the front chassis 7 as in the case of the window display module 9. The metal plate 21 is then secured to the back cover chassis 23 by engaging a screw 27 with a nut 26, which has been welded, for example.

The front chassis 7 and back cover chassis 23 are secured by engaging each screw 28 with the screw accepting hole of the relevant screw accepting projection part 7f of the front chassis 7.

Accordingly, even if an external force such as vibration is applied to the mobile information terminal, the metal plate 21 does not move in the chassis.

[Generalization]

The mobile information terminal in the embodiment of the present invention is structured with a window display part (window display module 9), a sealing part (gasket 6), and a chassis part (front chassis 7). The window display part is formed by laminating a sheet of window glass on a touch-panel-equipped display panel formed by laminating a touch panel having a main flat surface and a display panel having a main flat surface, these main flat surfaces having substantially the same size, the window glass having a smaller main flat surface than the touch-panel-equipped display panel. The sealing part substantially matches a prescribed shape (rectangular ring shape) formed by the outer circumferences of the window glass and touch-panel-equipped display panel, and has tight adhesion at least to another contact member. The chassis part has a panel facing wall surface part (panel facing wall surface part 7a) that faces a flat part (panel upper-side outer circumference 4a) of the prescribed shape formed by the outer circumferences of the window glass and touch-panel-equipped display panel. The mobile information terminal in this embodiment is assembled by interposing the sealing part between the panel facing wall surface part of the chassis part and the flat surface having the prescribed shape formed by the outer circumferences of the window glass and touch-panel-equipped display panel.

The mobile information terminal in the embodiment of the present invention has a support plate part (metal plate 21) that supports the window display part from its rear surface side; the chassis part is formed with a front chassis part (front chassis 7), which is on the front side of the mobile information terminal, and a rear chassis part (back cover chassis 23), which is on the rear side. The front chassis part has groove parts (groove parts 7c and plate fitting groove part 7e), into which an end of the support plate part fits to support the support plate part, in its inner wall surfaces. The rear chassis part and support plate part each have a securing part (nut 24 and screw 25) that secures the support plate part, the end of which has fitted into the groove part of the front chassis part. The support plate part in this case may have a plurality of claw parts (claw parts 21a) protruding from its ends, the front chassis part may have a plurality of notch parts (notch parts 7d), which extend to the groove parts and into which the claw parts of the support plate part are movably inserted, on the inner wall surfaces, and the groove parts may slidably support the claws of the support plate part.

The mobile information terminal in the embodiment of the present invention has a support plate part (metal plate 21) that supports the window display part from its rear surface side; the chassis part is formed with a front chassis part (front chassis 7), which is on the front side of the mobile information terminal, and a rear chassis part (back cover chassis 23), which is on the rear side. The front chassis part and rear chassis part each have a chassis securing part (screw accepting projection part 7f and screw 28) that secures their counterpart. The rear chassis part also has a support plate securing part (nut 26 and screw 27) that secures the support plate part.

Furthermore, as for the mobile information terminal in the embodiment of the present invention, the window display part is formed by laminating the main flat surface of the touch-panel-equipped display panel and the main flat surface of the window glass so that the central positions of these main flat surfaces substantially match. The sealing part has a ring shape that is formed as the prescribed shape by the outer circumferences of the window glass and touch-panel-equipped display panel. The flat surface part of the panel facing wall surface part of the chassis part has a ring shape that is formed as the prescribed shape by the outer circumferences of the window glass and touch-panel-equipped display panel.

According to the mobile information terminal, having the structure as described above, in the embodiment of the present invention, the outer circumferential width ARW from the outermost circumferential edge of the front chassis 7 to the outermost circumferential edge of the effective display area ACA of the display panel 5 can be narrowed as much as possible and a sufficient area can be obtained as the effective display area ACA. Thus, the mobile information terminal according to the embodiment of the present invention makes it possible to increase the amount of displayed information by enlarging the screen and to maintain superior portability and maneuverability.

The mobile information terminal in this embodiment can be applied not only to, for example, advanced mobile telephone terminals and tablet terminals or slate PCs but also to, for example, so-called personal digital assistants (PDAs), mobile game machines, mobile navigation terminals, and other various mobile information terminals.

The above description of the embodiment is just an example of the present invention. Accordingly, it will be appreciated that the present invention is not limited to the embodiment described above and variations and modifications are possible according to, for example, design without departing from the technical concept of the present invention.

It will be also understood by those skilled in the art that various modification and combinations and other embodiments may be derived from design or other elements within the range of the claims of the present invention or an equivalent range of the claims.

REFERENCE SIGNS LIST

1: window glass, 2: adhesive, 3: touch panel, 5: display panel, 4: touch-panel-equipped display panel, 4a: panel upper-side outer circumference, 6: gasket, 7: front chassis, 7a: panel facing wall surface part, 7b: front-side circumferential edge, 7c: groove part, 7d: notch part, 7e: plate fitting groove, 7f: screw accepting projection part, 9: window display module, 21: metal plate, 21a: claw part, 23: back cover chassis, 24: nut, 25, 27, 28: screw

The invention claimed is:
1. A mobile information display terminal comprising:
a display having
a glass sheet, and
a touch-equipped display panel that is laminated to said glass sheet, said touch-equipped display panel including
a touch panel having a transparent touch panel part, and
a display panel that opposes said touch panel, said glass sheet having a smaller surface area on a main face thereof than a main face of said touch-equipped display panel;
a chassis having a panel facing wall that faces said main face of said touch-equipped display panel; and
a sealing part having an annular shape that substantially matches a periphery of an inner surface of said glass sheet, said inner surface being opposite of said main surface of said glass sheet, said sealing part being interposed between and touching said panel facing wall and a main face of the transparent touch panel part wherein
the chassis includes
a front chassis part that forms at least a portion of an outermost front side and a side surface of the mobile information display terminal, and
a rear chassis part on a rear side of the mobile information display terminal, wherein
the front chassis part being a single annular shaped unit that contacts the rear chassis part,
the front chassis part has a groove part in an inner wall surface of the front chassis part, said groove sized to receive an end of a support plate part,
the support plate part has a plurality of claw parts protruding from at least one end thereof, and
the front chassis part has a plurality of notches on the inner wall surface, which extend to the groove part and configured to receive respective of the plurality of claw parts of the support plate part that are movably inserted.
2. The mobile information display terminal according to claim 1, further comprising:
the support plate part that supports the touch-equipped display panel from a rear surface side thereof.
3. The mobile information display terminal according to claim 1, wherein
the rear chassis part and the support plate part each are configured to receive a securing part that secures the support plate part to the rear chassis part.
4. The mobile information display terminal according to claim 1, wherein:
the groove part of the front chassis part slidably supports the plurality of claws of the support plate part.
5. The mobile information display terminal according to claim 1, wherein
the front chassis part includes a chassis securing part that secures the rear chassis part, and
the rear chassis part includes a chassis securing part that secures the front chassis part.
6. The mobile information display terminal according to claim 5, wherein
the rear chassis part and the support plate part each include a support plate securing part that secures the support plate part to the rear chassis part.
7. The mobile information terminal according to claim 1, wherein:
central positions of the main face of said glass sheet and the main face of said touch-equipped display panel substantially match.
8. The mobile information display terminal of claim 1, wherein
the sealing part has a ring shape.

* * * * *